Figure 1:
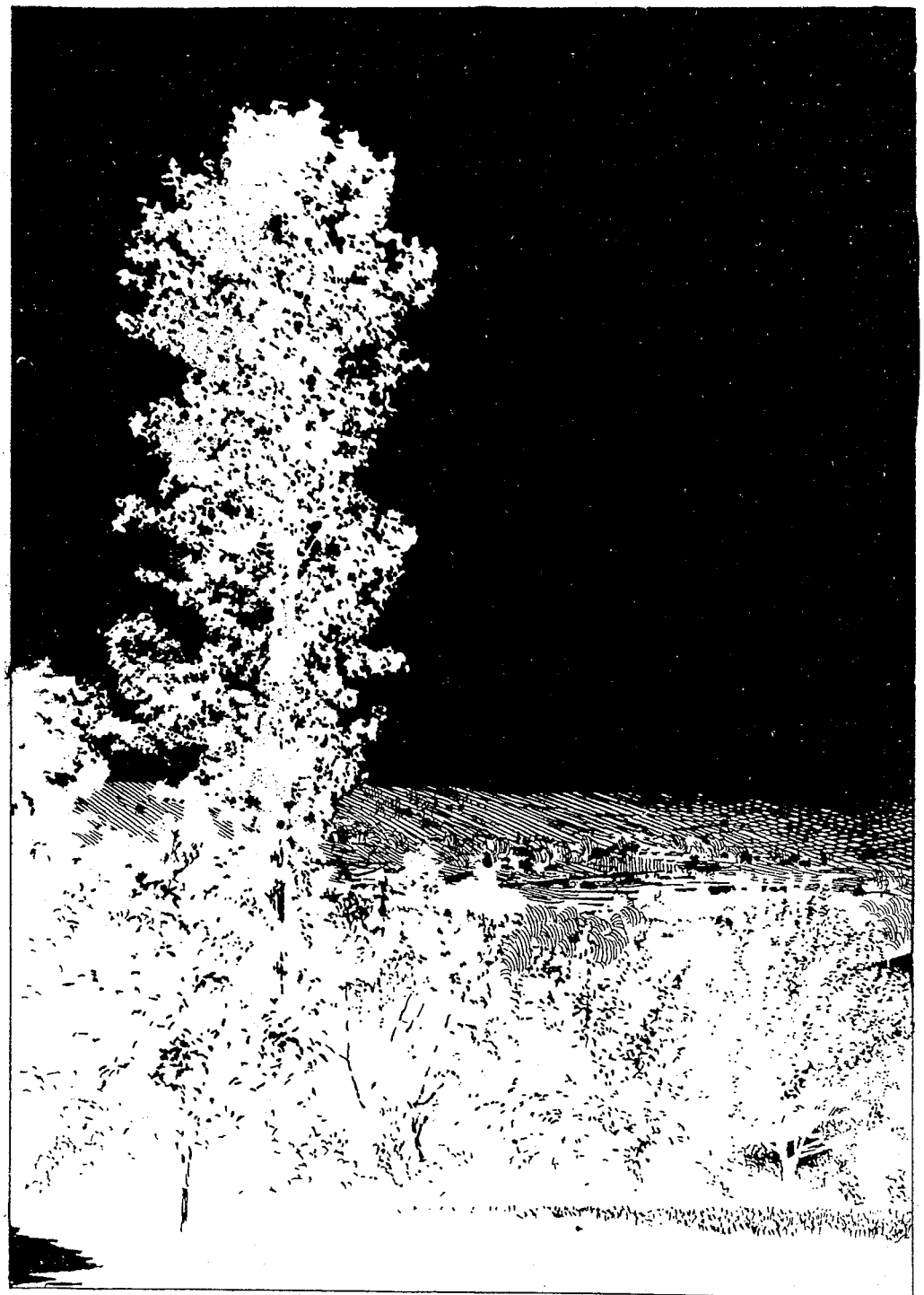

FREDERICK GLESSNER, ASSIGNOR TO
FRED. GLESSNER & JOHN STANTON.
IMPROVEMENT IN PHOTOGRAPHY.

No. 96,691. Patented Nov. 9, 1869.

8 Sheets—Sheet 2.

FREDERICK GLESSNER, ASSIGNOR TO
FRED. GLESSNER & JOHN STANTON.
IMPROVEMENT IN PHOTOGRAPHY.

No. 96,691. Patented Nov. 9, 1869.

Witnesses:

Inventor:

8 Sheets—Sheet 3.

FREDERICK GLESSNER, ASSIGNOR TO FRED. GLESSNER & JOHN STANTON.
IMPROVEMENT IN PHOTOGRAPHY.

No. 96,691. Patented Nov. 9, 1869.

Witnesses: Inventor:

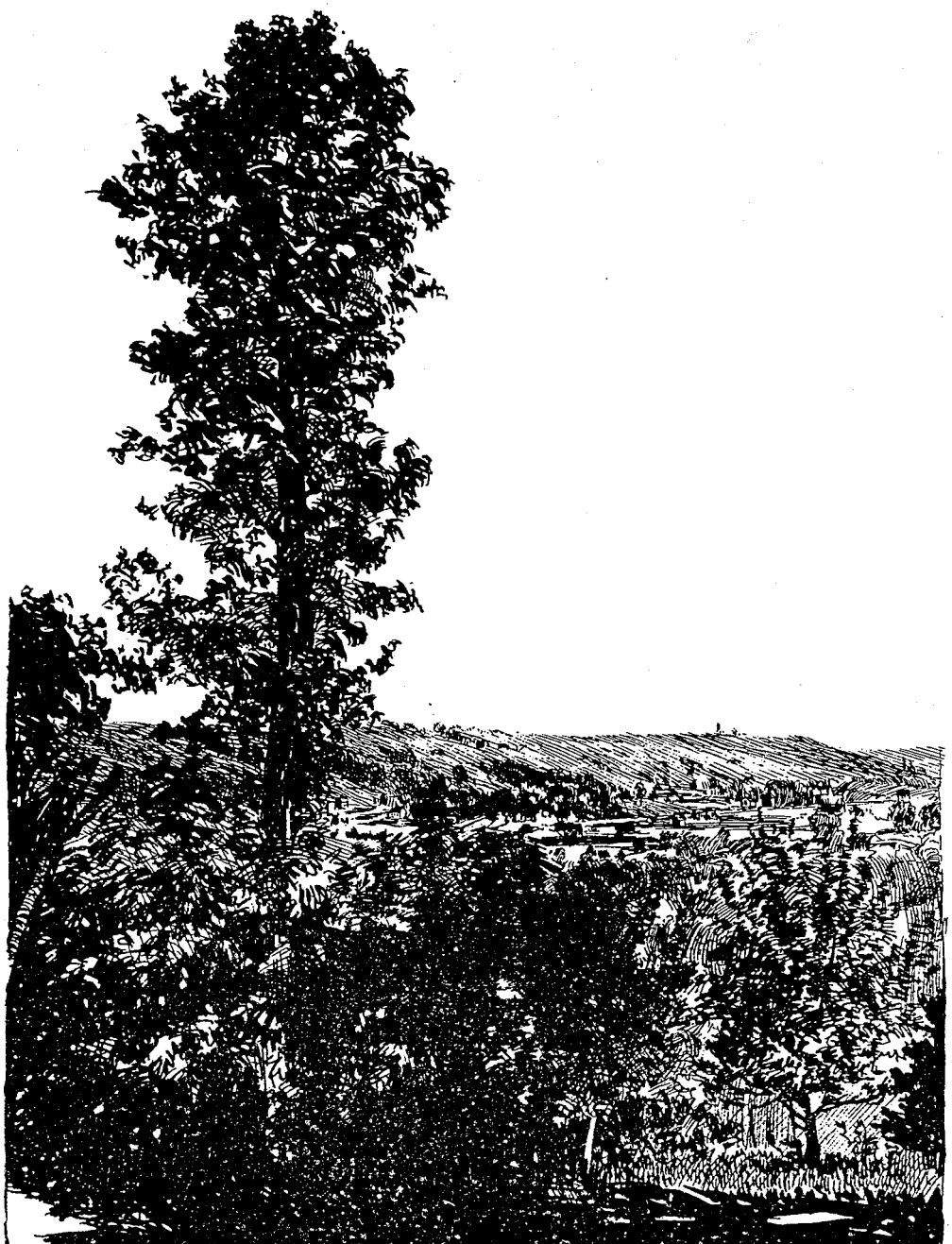

8 Sheets—Sheet 5.

FREDERICK GLESSNER, ASSIGNOR TO
FRED. GLESSNER & JOHN STANTON.
IMPROVEMENT IN PHOTOGRAPHY.

No. 96,691. Patented Nov. 9, 1869.

8 Sheets—Sheet 6

FREDERICK GLESSNER, ASSIGNOR TO
FRED. GLESSNER & JOHN STANTON.
IMPROVEMENT IN PHOTOGRAPHY.

No. 96,691. Patented Nov. 9, 1869.

8 Sheets—Sheet 7.

FREDERICK GLESSNER, ASSIGNOR TO FRED. GLESSNER & JOHN STANTON.
IMPROVEMENT IN PHOTOGRAPHY

No. 96,691. Patented Nov. 9, 1869.

8 Sheets—Sheet 8

FREDERICK GLESSNER, ASSIGNOR TO FRED. GLESSNER & JOHN STANTON.
IMPROVEMENT IN PHOTOGRAPHY.

No. 96,691.    Patented Nov. 9, 1869.

UNITED STATES PATENT OFFICE.

FREDERICK GLESSNER, OF CINCINNATI, OHIO, ASSIGNOR TO HIMSELF AND JOHN STANTON, OF SAME PLACE.

IMPROVEMENT IN PHOTOGRAPHY.

Specification forming part of Letters Patent No. 96,691, dated November 9, 1869.

*To all whom it may concern:*

Be it known that I, FREDERICK GLESSNER, of Cincinnati, Hamilton county, Ohio, have invented a new and useful Improvement in Photography; and I do hereby declare the following to be a full, clear, and exact description thereof, reference being had to the accompanying illustrations, making part of this specification.

My invention relates to a mode of producing an artificial sky on ordinary photographic and other actinic landscapes. The difficulty of combining in one photograph both the sky and the landscape has heretofore induced artists to omit the sky entirely from most pictures of this kind. It is true that natural skies have been taken under favorable circumstances by a separate operation from the taking of the landscape, and afterward printed by a separate exposure, but several serious practical difficulties have caused the disuse of this method. Among the most serious of these difficulties has been the liability to streaks and blotches in the cloudless portion of the sky, thus marring the general effect and destroying the proper contrasts of sky and clouds. To the above difficulty may be added that of adapting the horizon or lines of demarkation in land and sky, and that of finding an arrangement of clouds to suit a particular landscape. It has also been attempted to prepare a sky plate or negative by artificial means, to wit, by so coating a plate of glass as to shut out the actinic rays entirely, and then, by a process of ruling, engraving, and stippling, to cut through that coating by lines, points, or spaces, to produce the dark or graded tints of the sky and clouds, the lights being produced by the untouched or but slightly-touched parts of the coating, the sky and clouds in this case also being printed separately from the land or terraqueous portion of the picture; but this mode has always been objectionable, from the inharmonious effect in one picture of engraved and purely actinic details. Still another expedient has been to produce the light portions of the clouds by painting or otherwise stopping out light directly upon the negative; but this mode has been found ineffective for representing the proper gradations of light and shade in the sky and clouds.

To enable those skilled in the art of photographing to avail themselves of my improvement, I have prepared a series of pictures, all from the same negatives—namely, one for the sky and one for the landscape proper—and now proceed to explain my mode of operation in producing skies.

Figure 2:
Figure 3:
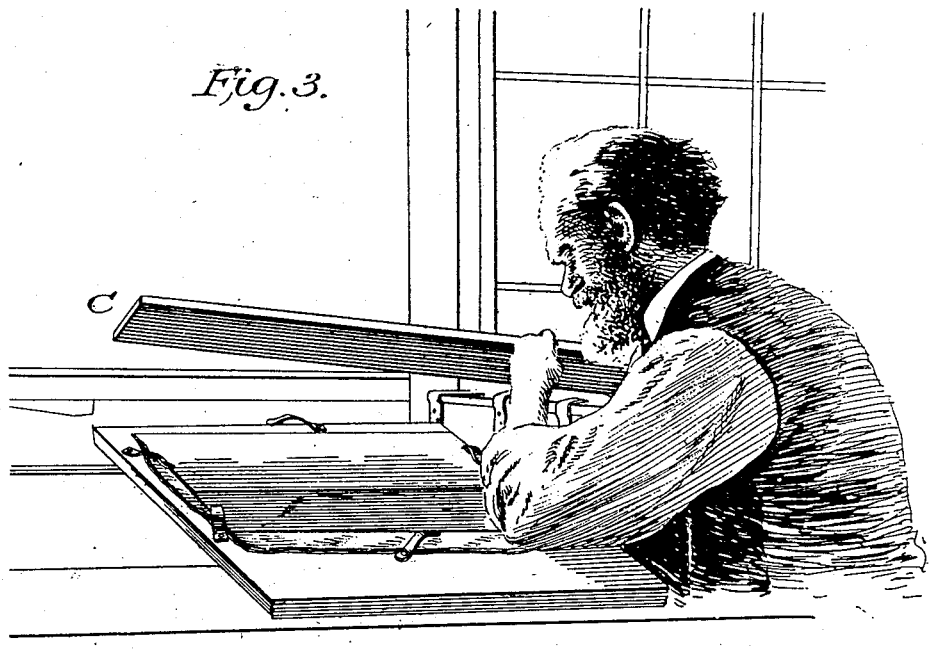

I use a landscape-negative, A, Figure 1, one or more sky-plates, B, Fig. 2, and one or more shades, C, Fig. 3. The landscape-negative (see A, Fig. 1) may be made in any way that will produce one, and the sky of this negative should be painted or stopped out, so as to leave the paper or other sensitive material under it pure white when the landscape is printed. (See Fig. 6.) The sky-plate (see B, Fig. 2) is formed by painting upon a piece of glass with opaque color the light portions of the clouds or other light objects I wish to introduce into the sky, and also painting over said plate at those parts corresponding to tall trees, and other objects in the landscape that extend up into the sky above the horizon, the object being to exclude the actinic rays at these parts, so as to preserve the lights of the object as printed by the landscape-negative. I then employ a shiftable screen or shade. (See C, Fig. 3.) A convenient form and material for this shade I have found to be a light board, sufficiently large to screen the picture; but any appliance may be used by which the printer can expose one part of the paper while under the sky-plate (or under a plain glass, for a cloudless sky) to the action of the light while printing, so as to print the sky with a gradation of tint from the top to the horizon, or in any other direction that may be desired.

Figure 7:

The picture, Fig. 6, is first printed from a landscape-negative (see A, Fig. 1) from which the sky has been completely stopped out in the usual way. The said landscape-negative is then lifted, and when a cloudless sky is desired (see Fig. 7) a plain glass is placed on the picture to hold it properly in the printing-frame, and the landscape portion being covered by a cloth or other opaque object, the shade C is then so held (see Fig. 3) as to expose the upper part of the sky, and is moved slowly toward the horizon, so as to allow the light to act the longest on the upper portion of the sky and to give an evenly-blended tint, which becomes lighter toward the horizon. This operation may be repeated where necessary to give the proper depth of shade or tint. When, however, clouds are to be represented, as in Fig. 8, I use, instead of plain glass, an artificial negative consisting of a glass plate, B, Fig. 2, which has the light portions of the clouds, and also all terrestrial objects which extend above the horizon stopped out by black paint or other opaque pigment. This negative is then, instead of the plain glass, placed over the skyless picture Fig. 6, and the sky is blended in by using the shade C in the same manner as directed for printing picture Fig. 7. As the sky-plate is clear except where stopped out, as above explained, the operator can watch the effect of the light while printing and terminate its action precisely at the right time.

Figure 4:
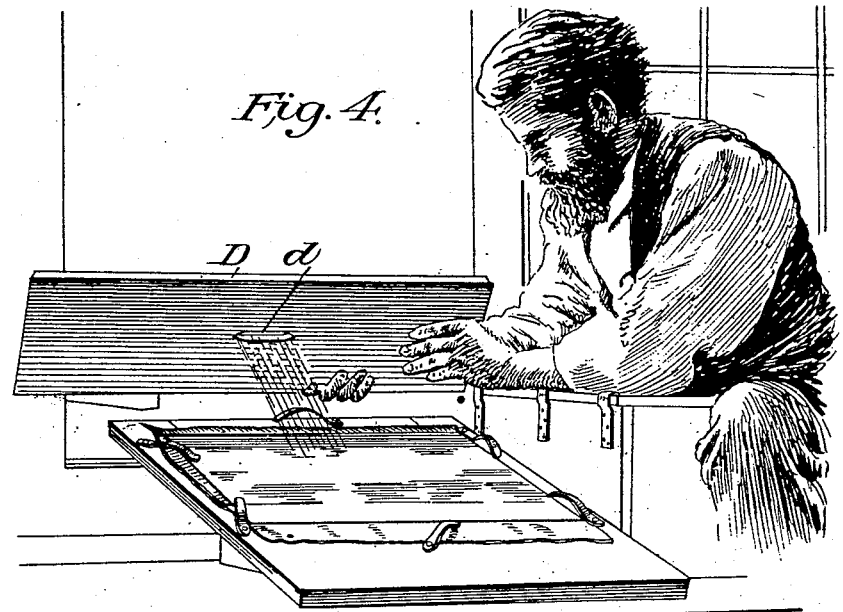
Figure 8:
Figure 9:
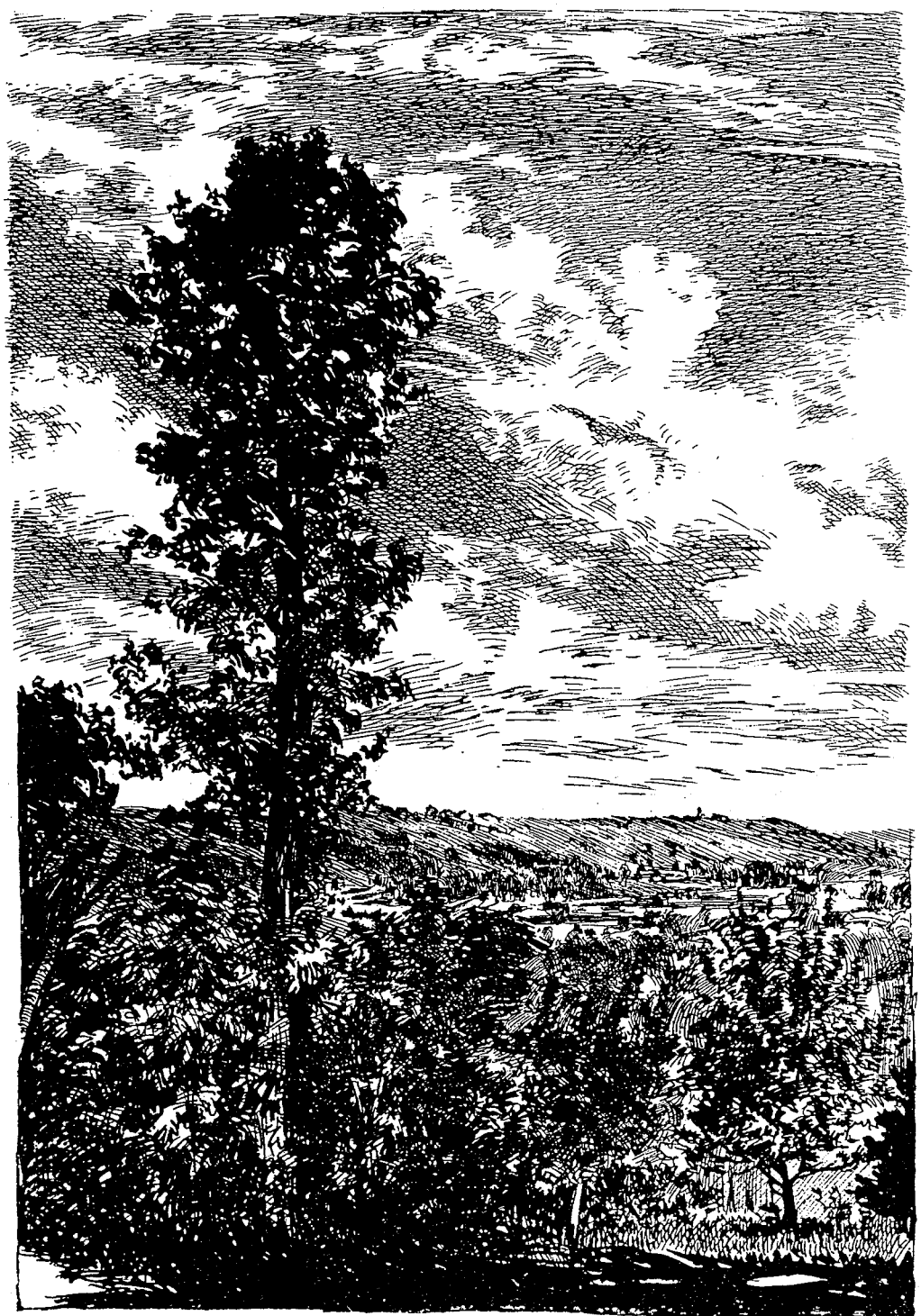

To produce a sky more highly finished, as shown in picture Fig. 9, after the printing process has been carried forward, as described for making Fig. 8, I employ a perforated shade, D, Fig. 4, and hold it so as to allow a pencil of sunlight through the perforation $d$ to fall on such parts of the clouds or sky as I wish to print deeper, as the nature of the subject and the effect I may wish to produce require.

Figure 10:

Fig. 10 shows a different character of sky, printed in the same manner, sharply-defined objects—such as a flash of lightning—being printed on the under side of the negative, and such objects as clouds on the upper side thereof.

A flock of birds or other dark objects are obtained by a separate negative, whose entire under surface, with the exception of the figures, is stopped out.

Figure 5:
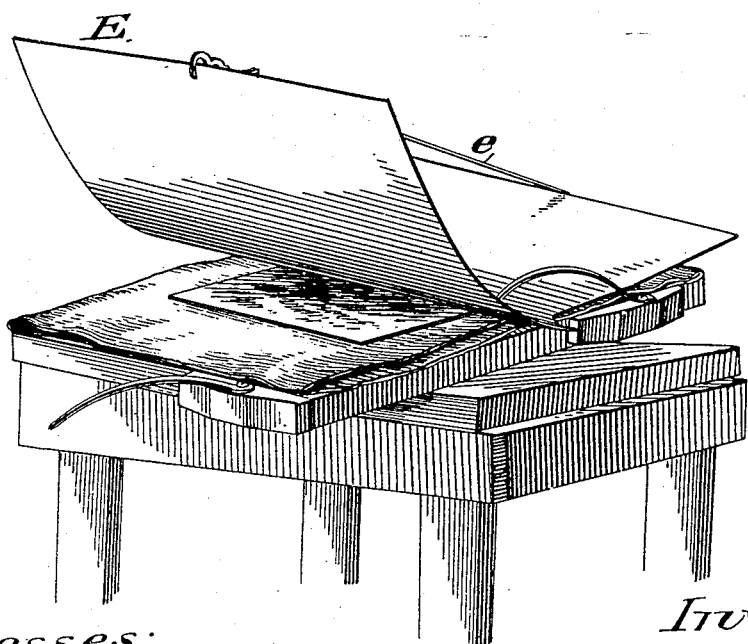

When I wish to produce a graded sky by diffused light, either with or without sky-plates, I use a bent card-board or other shade, E, (see Fig. 5,) secured in such a position as to allow the strongest light to fall on the part of the picture I wish to print deepest, the said board being secured more or less back by the card $e$, according to the effect desired.

In the use of the shades C, D, and E, I have supposed the picture to be at rest and the shades to be moved; but the same effects may obviously be produced by reversing the above, the shades being stationary and the picture movable.

The shade E, for printing with diffused light, may be of any curve, or may even be flat in some cases.

Artificial light may be used in the printing of skies by my process.

My process, although specially designed for photographic printing, is applicable to other kinds of actinic representations.

I am aware that natural clouds have been photographed by short exposure upon a separate negative-plate and printed by a second printing; but, owing to practical difficulties, this method has been virtually abandoned.

I am also aware that artificial skies have been produced by stopping out the clouds in the original negative, and also that negatives have been made and used by a second printing whose clouds and other light objects have been obtained by scraping, ruling, and stippling on a stopped-out surface, and I therefore disclaim all such methods.

I claim herein as new and of my invention—

1. The sky-plate B, made as described, with the light parts of clouds or such other light objects as the artist wishes to produce above the horizon painted on it, the rest of that part used for producing the sky being left clear.

2. The shade C or its equivalent when used for photographic or other actinic printing of graded skies, either with or without a sky-plate, as above explained.

3. The perforated and movable shade D, when used as described, to impart the desired shade or depth of tone to certain parts of the picture.

4. The shade E, for printing by diffused light when used with or without sky-plates.

In testimony of which invention I hereunto set my hand.

FRED. GLESSNER.

Witnesses:
GEO. H. KNIGHT,
JAMES H. LAYMAN.